United States Patent
Thomas et al.

(10) Patent No.: US 6,679,408 B1
(45) Date of Patent: Jan. 20, 2004

(54) UTILITY RACK FOR A PICKUP TRUCK

(76) Inventors: David Mark Thomas, RR#1, Site 1, Compartment 9, Mara, British Columbia (CA), V0E 2K0; Albert Carl Riddle, RR#1, Site 1, Compartment 9, Mara, British Columbia (CA), V0E 2K0

( * ) Notice: Subject to any disclaimer, the term of this patent is extended or adjusted under 35 U.S.C. 154(b) by 0 days.

(21) Appl. No.: 10/323,783

(22) Filed: Dec. 20, 2002

(51) Int. Cl.[7] .................................................. B60R 9/10
(52) U.S. Cl. ........................ 224/403; 224/405; 224/924
(58) Field of Search ........................... 224/42.13, 42.18, 224/42.19, 42.25, 321, 403, 405, 924; 211/20; 414/462

(56) References Cited

U.S. PATENT DOCUMENTS

| | | | |
|---|---|---|---|
| 4,316,544 A | * 2/1982 | Goldstein | ...................... 211/20 |
| 4,437,597 A | 3/1984 | Doyle | |
| 4,772,165 A | * 9/1988 | Bartkus | ...................... 224/403 |
| 5,092,504 A | 3/1992 | Hannes et al. | |
| 5,127,564 A | 7/1992 | Romero | |
| 5,261,719 A | * 11/1993 | Tucker | ...................... 224/405 |
| 5,301,817 A | * 4/1994 | Merritt | ...................... 211/20 |
| 5,427,286 A | 6/1995 | Hagerty | |
| 5,476,200 A | 12/1995 | Wong | |
| 5,516,020 A | * 5/1996 | Lawler et al. | .............. 224/924 |
| 5,611,472 A | 3/1997 | Miller | |
| 5,699,945 A | 12/1997 | Micklish | |
| 5,836,490 A | * 11/1998 | Price | .......................... 224/403 |
| 6,179,181 B1 | 1/2001 | Johnson et al. | |
| 6,394,326 B1 | * 5/2002 | Lanier | ........................ 224/924 |

* cited by examiner

Primary Examiner—Gary E. Elkins
(74) Attorney, Agent, or Firm—Anthony C. Edwards

(57) ABSTRACT

The rack for mounting to a vehicle includes horizontal upper and lower cross members. A pair of downwardly disposed mounting posts are mounted on opposite ends of the upper cross member. Where the truck is a pickup truck having a cargo box, the posts fit downwardly into the post holes in the side walls of the pickup truck box. At least one wheel clamp assembly is mounted, at it's an upper end, to the upper cross member and mounted at its lower end to the lower cross member. Each wheel clamp assembly includes first and second opposed facing parallel vertical clamp members defining a wheel receiving space therebetween sized for snug mating on either side of a wheel disposed between the clamp members and the cross members. The clamp members each have laterally aligned apertures therethrough. The apertures are sized and positioned to accommodate a lock bar of a lock, such as a U-shaped lock, journalled therethrough so that the lock bar may be inserted through the spokes of the wheel and so that a U-shaped hasp of the lock may be positioned over upper ends of the clamp members into locking engagement with the lock bar journalled through the apertures. The wheel is thereby releasably locked between the clamp members.

18 Claims, 10 Drawing Sheets

UTILITY RACK FOR A PICKUP TRUCK

FIELD OF THE INVENTION

This invention relates to the field of racks for mounting into the box of a pickup truck and in particular to a modular rack for holding a plurality of motorcycles and the like upright on the bed of a pickup truck box.

BACKGROUND OF THE INVENTION

In the prior art, applicant is aware of numerous attempts to mount racks such as bicycle racks into pickup trucks. The racks may be categorized generally by their method of attachment to the pickup truck. Thus, a first category of rack includes U.S. Pat. No. 5,427,286 which issued to Hagerty on Jun. 27, 1995, and discloses a bicycle rack which bolts onto the front wall of the bed of a pickup truck. A second category of bike racks which mount into the bed of a pickup truck for example by being bolted to the floor include U.S. Pat. No. 4,437,597 which issued to Doyle on Mar. 20, 1984 for a Mounting Apparatus for a Dirt Bike, U.S. Pat. No. 5,476,200 which issued to Wong on Dec. 19, 1995 for a Pick-up Truck Bicycle Rack, and U.S. Pat. No. 5,516,020 which issued to Lawler et al. on May 14, 1996 for a Truck Mount Bicycle Rack. The third category, and the category which most closely applies to the present invention, includes racks which are mountable into a pickup truck box by the mounting of stakes or posts on opposite ends of the rack into oppositely disposed holes in the upper side rails of the pickup truck box. This category is exemplified by U.S. Pat. No. 5,092,504 which issued to Hannes et al. on Mar. 3, 1992 for a Bicycle Rack for Pick up Truck, U.S. Pat. No. 5,127,564 which issued to Romero on Jul. 7, 1992 for a Bicycle Holder for Pickup Truck, U.S. Pat. No. 5,611,472 which issued to Miller on Mar. 18, 1997 for a Bicycle Rack for Pick-up Trucks, U.S. Pat. No. 5,699,945 which issued to Micklish on Dec. 23, 1997 for a Side Rail Mounted Bicycle Rack for Pickup Trucks, and U.S. Pat. No. 6,179,181 which issued to Johnson et al. on Jan. 30, 2001 for a Bike Transport Rack.

The prior art identifies the problem of moving dirt bikes, motorcycles, motorbikes, motor scooters and the like to remote locations where they may be used to ride trails or otherwise participate in motor sport activities. In so much as dirt bikes, mountain bikes and the like represent a significant investment; it is clearly advantageous to protect them from lateral and longitudinal movement within the box of a pickup truck so as to avoid damage. It is thus an object of the present invention to provide for the rigid releasable mounting of dirt bikes, mountain bikes and the like into a rack which may be secured into the box of a pickup truck so as to provide for secure and releasable locking of a plurality of bikes into the rack and in one embodiment to also provide for the carrying of ancillary equipment such as helmets and body armour.

SUMMARY OF THE INVENTION

The present invention is a rack for mounting to a vehicle. The rack includes horizontal upper and lower cross members. A pair of downwardly disposed mounting posts are mounted on opposite ends of the upper cross member. Where the truck is a pickup truck having a cargo box, the posts fit downwardly into the post holes in the side walls of the pickup truck box. At least one wheel clamp assembly is mounted, at it's an upper end, to the upper cross member and mounted at its lower end to the lower cross member. Each wheel clamp assembly includes first and second opposed facing parallel vertical clamp members defining a wheel receiving space therebetween sized for snug mating on either side of a wheel disposed between the clamp members and the cross members. The clamp members each have laterally aligned apertures therethrough. The apertures are sized and positioned to accommodate a lock bar of a lock, such as a U-shaped lock, journalled therethrough so that the lock bar may be inserted through the spokes of the wheel and so that a U-shaped hasp of the lock may be positioned over upper ends of the clamp members into locking engagement with the lock bar journalled through the apertures. The wheel is thereby releasably locked between the clamp members.

In one embodiment at least one stabilizer bar is mounted to the lower cross member so as to extend forwardly and rigidly for bracing of the lower cross member against the vehicle, for example a forward wall of the pickup truck box when the mounting posts are mounted in the post holes of the box side walls. The mounting posts may be telescopically mounted to the ends of the upper cross member for lateral telescopic adjustment of a lateral spacing between the mounting posts.

The apertures in the clamp members may be elongate vertical slots.

The clamp members may have opposite forward and rear faces. The rear faces may be mounted to the cross members. The forward faces may be canted into the wheel receiving space so as to define a convergent entryway into the wheel receiving space for assisting entry of a wheel between the clamp members.

The clamp members may have bearing faces between their corresponding forward and rear faces. The bearing faces extend in parallel spaced apart array on opposite sides of the wheel receiving space. The slots are formed in the bearing faces and may extend vertically substantially the length of the bearing faces.

The rack may include a pair of the wheel clamp assemblies mounted to the cross members at opposite ends of the cross members so as to leave a utility spacing therebetween along the cross members. A variety of utility implements or attachments may be mounted, for example releasably or modularly, into the utility space on the cross members. One such attachment may be a modularly mountable third wheel clamp assembly releasably mountable to the cross members in the utility spacing. Another attachment may be a modularly mountable utility container releasably mountable to the cross members in the utility spacing.

DETAILED DESCRIPTION OF EMBODIMENTS OF THE INVENTION

Figure 1:
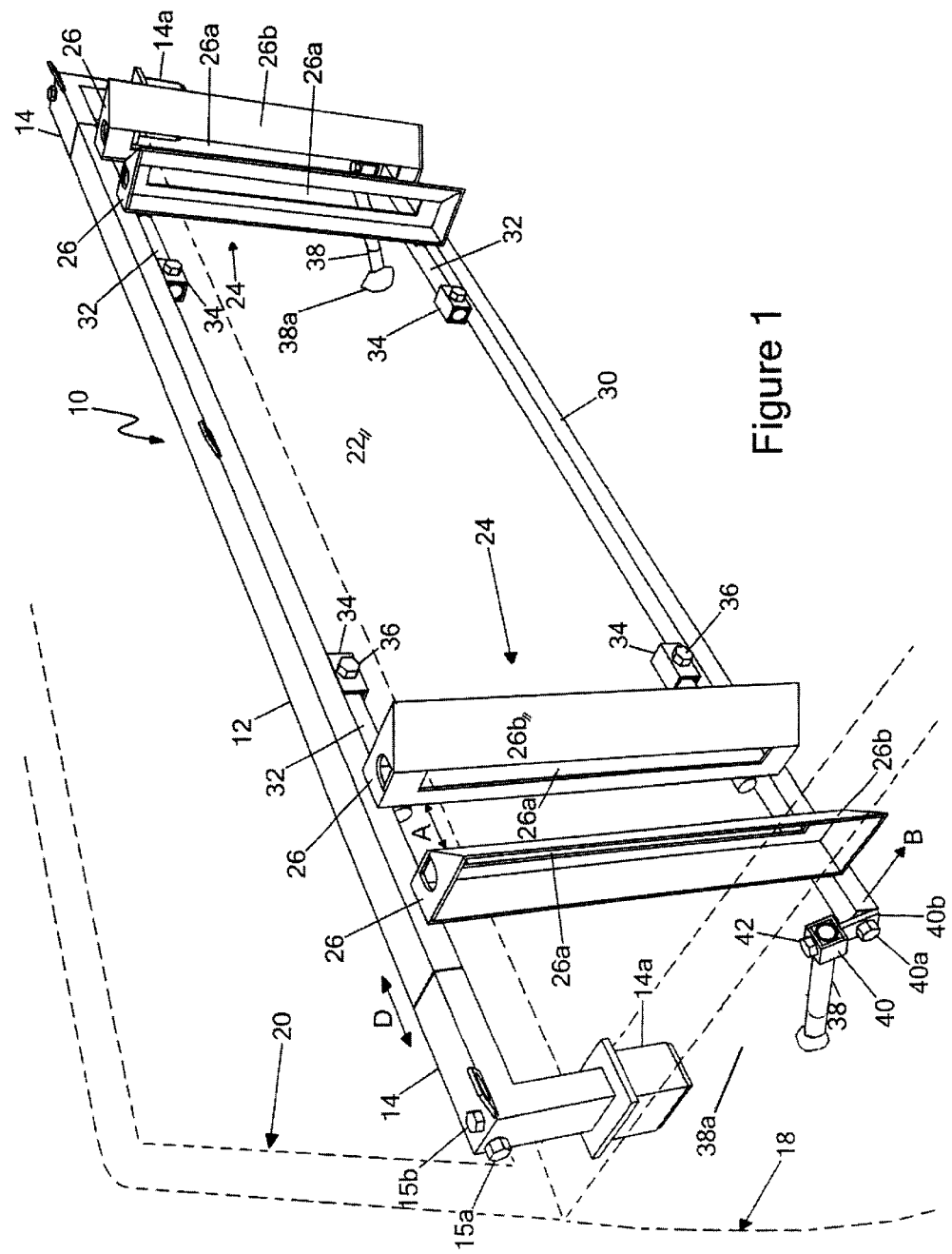
FIG. 1 is, in perspective view, the rack according to one embodiment of the present invention installed into the box of a pickup truck.
Figure 1A:
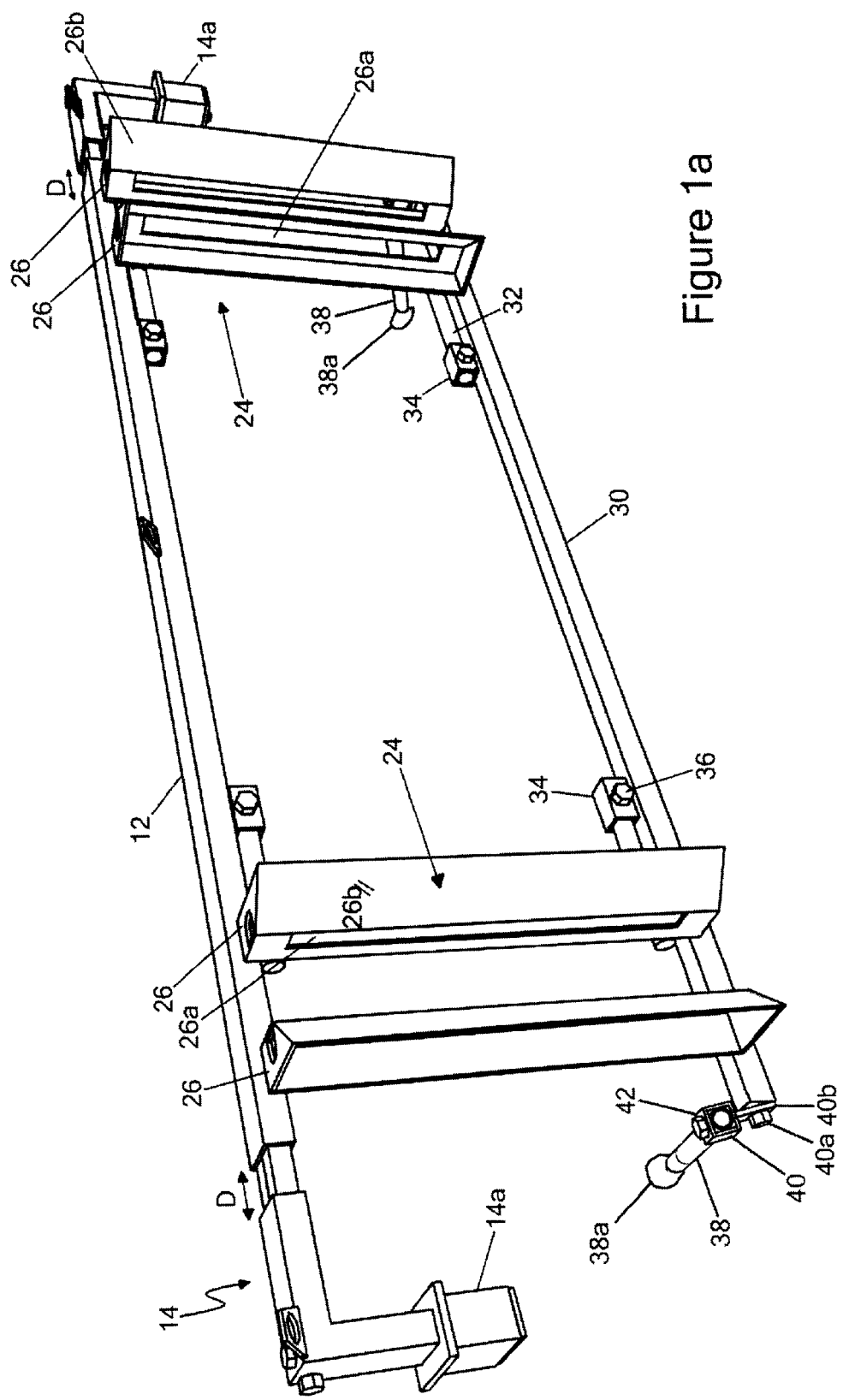
FIG. 1a is the rack of FIG. 1 with the mounting arms slightly telescopically extended.
Figure 2:
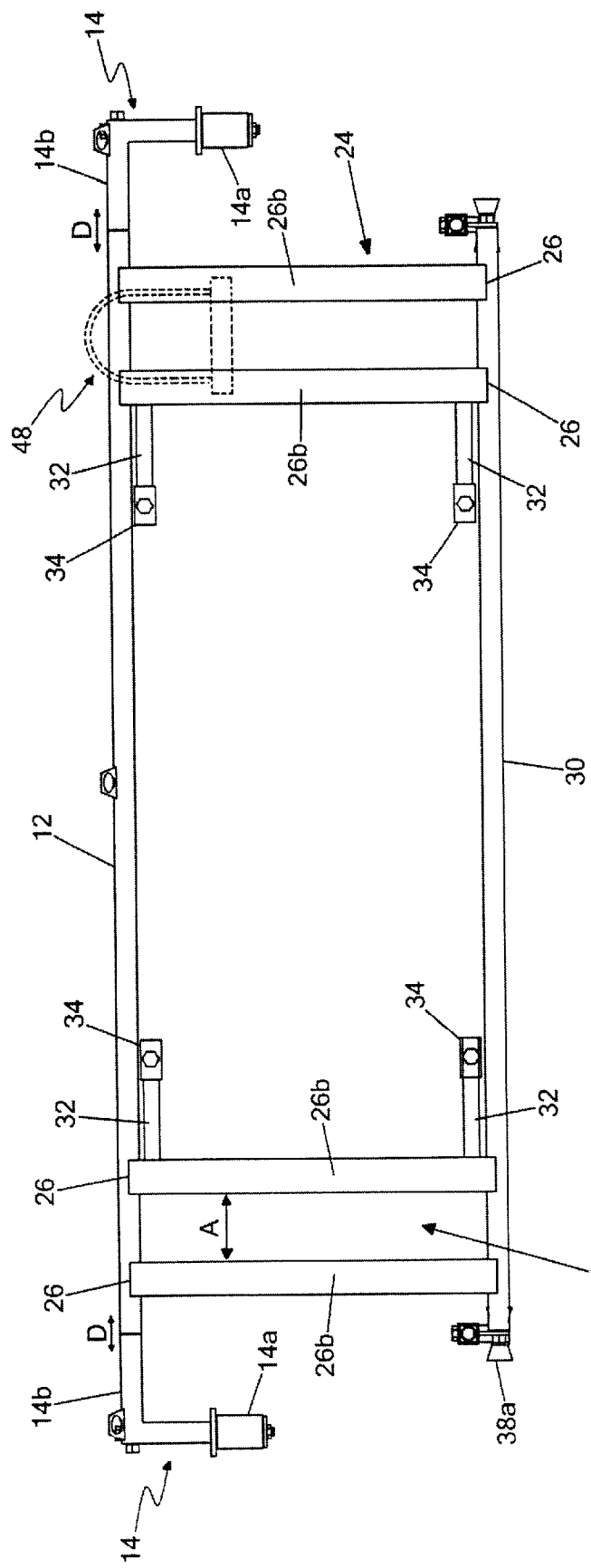
FIG. 2 is, in front elevation view, the rack of FIG. 1.
Figure 5:
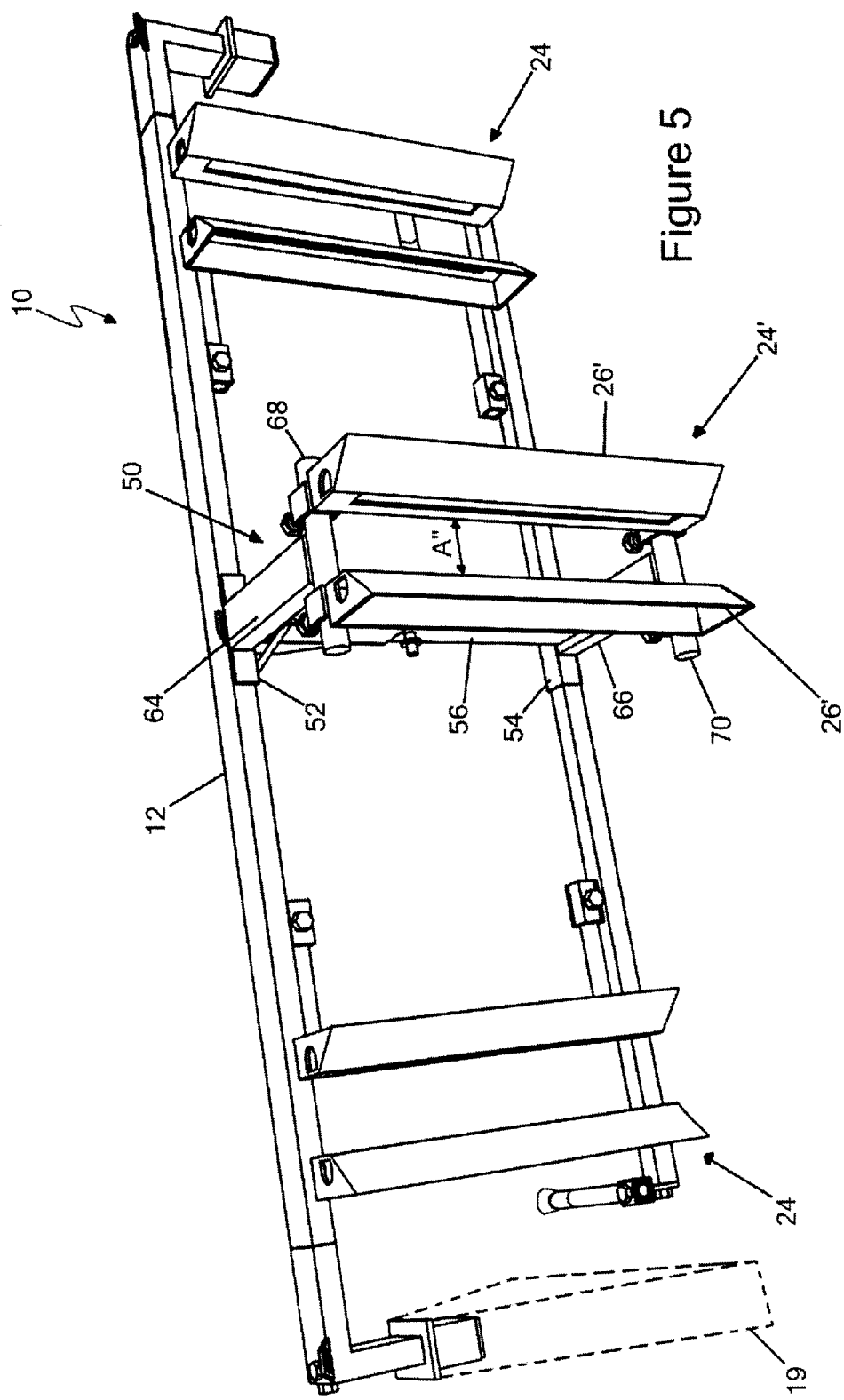
FIG. 5 is an alternative embodiment of the rack according to the present invention incorporating a third bike wheel clamp assembly.

As seen in the accompanying illustrations in which like elements are correspondingly numbered in each view, rack 10 includes an upper horizontal hollow cross-bar member 12 having open opposite ends into which are telescopically mounted a pair of opposed facing mounting arms 14. The upper inwardly disposed ends 14b of mounting arms 14 are sized for snug sliding engagement in the opposite ends of cross-bar member 12 wherein ends 14b may be releasably anchored by tightening bolt 14c at its exposed head 15a so as to slide internally threaded sleeve 14d mounted on bolt 14c, in direction A' relative to tube 14e. The lower base ends 14a of mounting arms 14 are sized for snug mounting downwardly into for example the post holes provided in the upper side rails 16, shown in dotted outline in FIG. 1, of truck box 18, or for example into correspondingly sized openings in the upper ends of stands 19, such as seen in FIG. 5 in dotted outline, which may be mounted for example onto a flat bed. Bolt head 15b may be tightened to expand base ends 14a in an embodiment in which they are resilient and the bolt, in threaded engagement (not shown) with the base, draws the base of base ends 14a upwardly to force the side walls outwardly. In FIG. 1 the rear wall 20 of the pickup truck cab and the inner front wall 22 of the pickup truck box are also illustrated in dotted outline.

Although illustrated herein as being adapted, as described above, for mounting into the post holes in a pickup truck bed, as stated above it is intended that the rack of the present invention may be mounted onto the bed of a flatbed truck by the use of suitable stands such as stands 19, whether they be a single post extension downwardly from mounting arms 14 for mounting onto the bed, or whether mounting arms 14 mount into tripod or triangular stands which themselves are mounted for example by bolting onto the bed of a flatbed truck.

Cross-bar member 12 and mounting arms 14 may be telescopically adjusted in direction D by sliding the ends 14b of mounting arms 14 in journalled engagement within the ends of cross-bar member 12 so as to space the base ends 14a of mounting arms 14 for engagement into the post holes of side rails 16. This provides for spacing between the side walls which may vary depending on the type of pickup truck.

Figure 6:
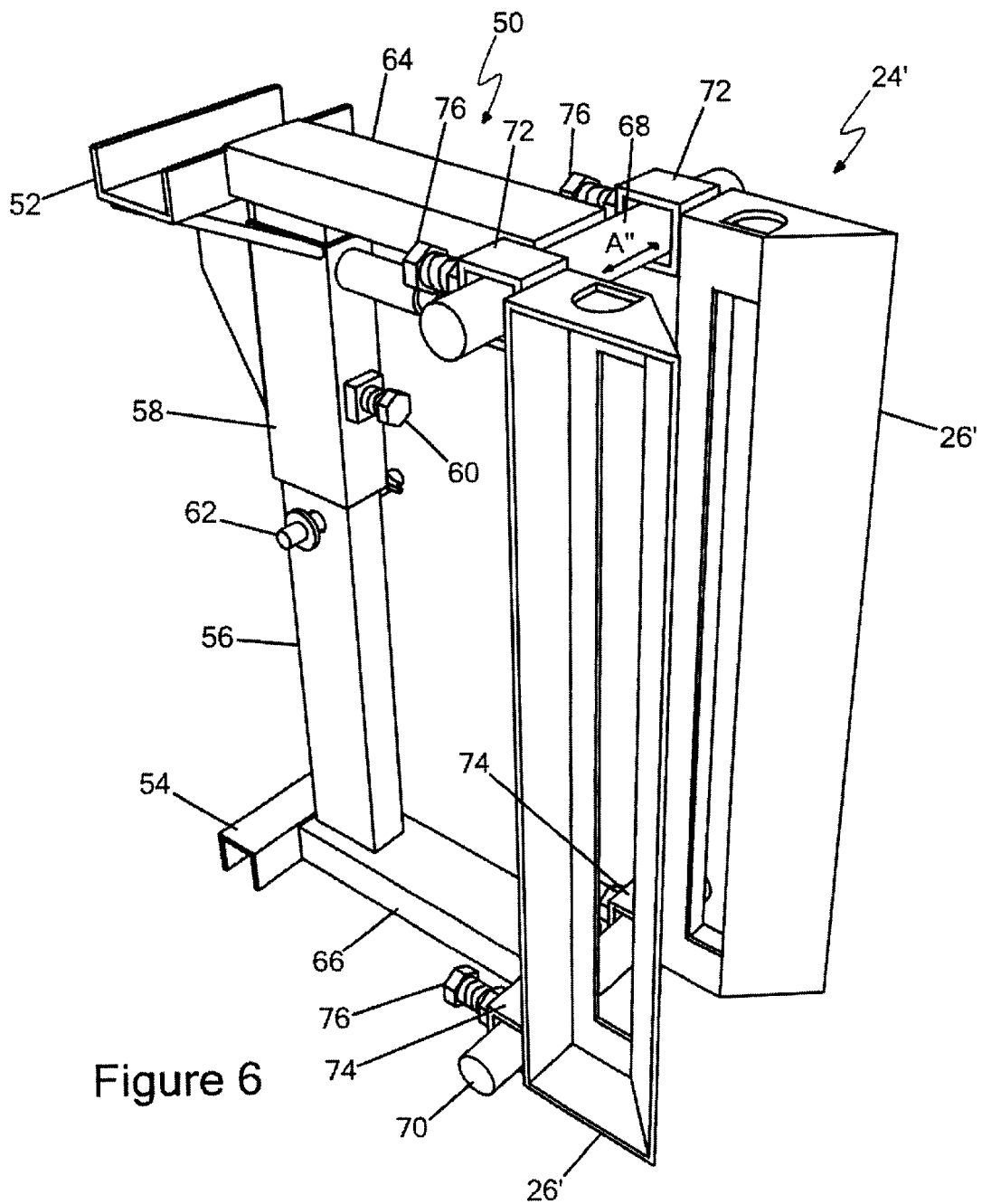
FIG. 6 is, in perspective view, a third bike wheel clamp assembly adapted for modular mounting between the bike wheel clamp assemblies of the rack of FIG. 5.
Figure 8:
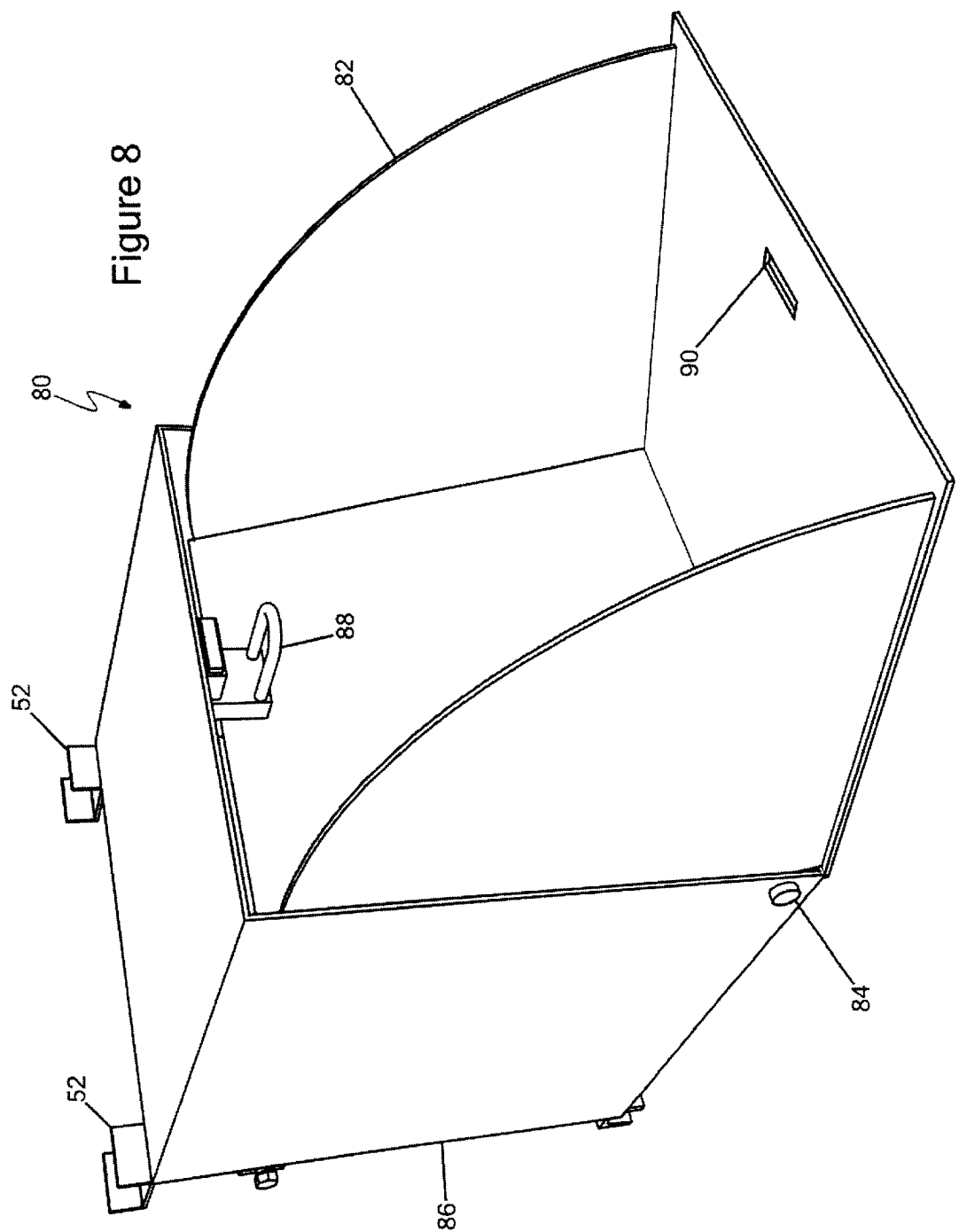
FIG. 8 is, in front perspective view, a utility box which may be modularly mounted between the bike wheel clamp assemblies of the rack of FIG. 7.

A wheel clamp assembly 24, which includes a pair of bike wheel clamp members 26, is mounted adjacent each end of cross-member 12 so as to leave a space in the center, between wheel clamp assemblies 24, for the modular mounting of for example either a third bike wheel clamp assembly such as seen in FIG. 6, or an equipment or utility box such as illustrated in FIG. 8. Bike wheel clamp assemblies 24 include separate opposed facing vertical clamp members 26 which may be adjusted in direction A so as to selectively adjust the spacing between the clamp members. The desired spacing depends on, for example, whether the bike wheel clamp is to accommodate a front wheel 28 of a motorbike or other motorized bike or, for example, the rear wheel of a mountain bike or other pedal bike.

In the embodiment illustrated, which is not intended to be limiting, the outside-most clamp members 26 are rigidly affixed as by welding to cross-bar member 12 at their upper ends and to a lower parallel cross-bar member 30 at their lower ends. The inner-most clamp members 26 are rigidly mounted to slides 32 which themselves may be slidably and adjustably positioned by sliding slides 32 through their corresponding bores in slide housings 34. Housings 34 are rigidly mounted to cross-bar members 12 and 30 so as to correspond to slides 32 mounted to the upper and lower ends of clamp members 26. Thus the spacing between clamp members 26 may be selectively and lockably adjusted in direction A, for example by the use of bolts 36, mounted on housings 34, which may be threadably tightened down onto slides 32.

Figure 3:
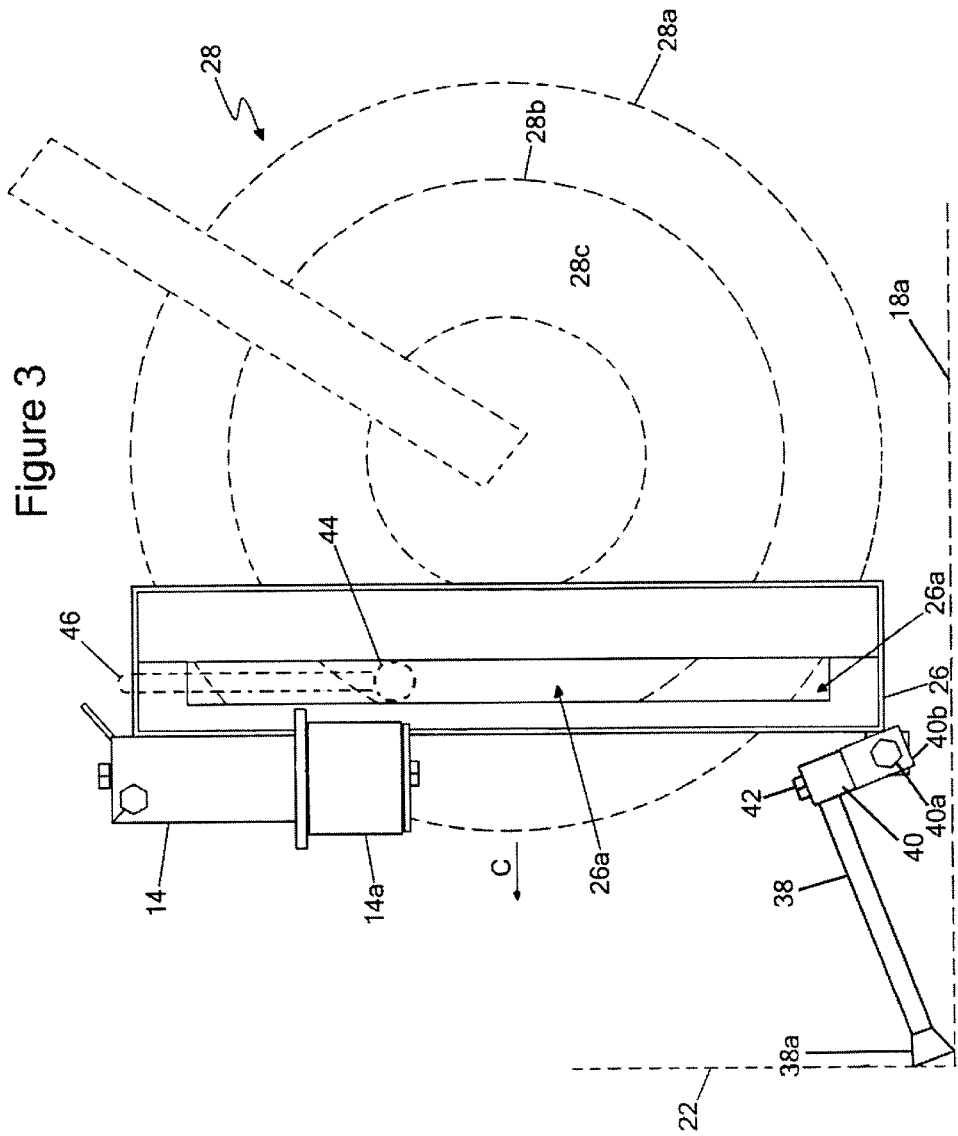
FIG. 3 is, in side elevation view, the rack of FIG. 1 showing in dotted outline a wheel inserted into the rack.
Figure 4:
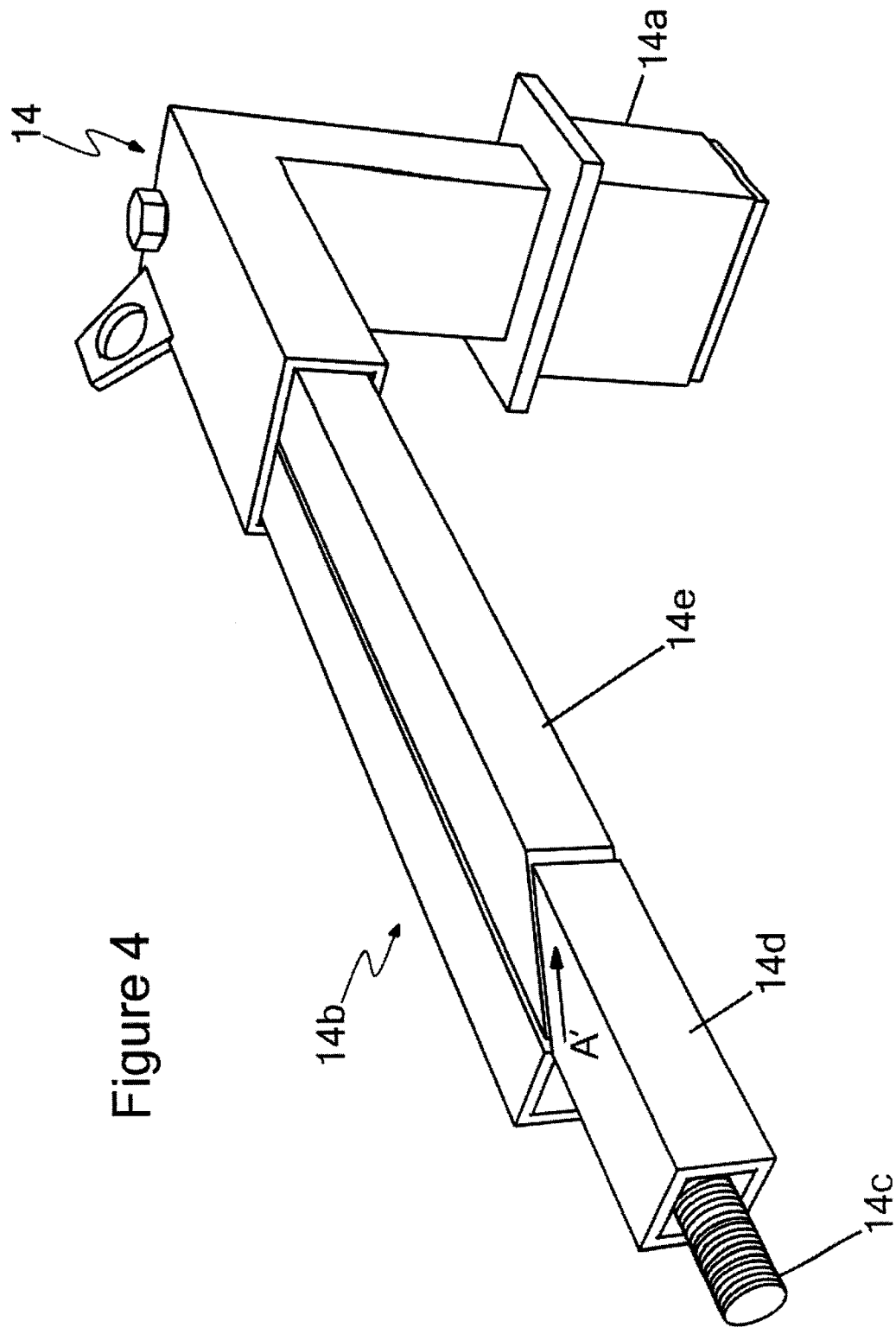
FIG. 4 is, in perspective view, one of the mounting arms of the rack of FIG. 1.

Cross-bar member 30 is not mounted to the side walls of the pickup truck box 18 but, rather, depends downwardly from cross-bar member 12 so as to hang, mounted to clamp members 26, spaced above the floor or bed 18a. Stabilizer bars 38 are adjustably mounted to the ends of cross-bar member 30 so as to extend forwardly between cross-bar member 30 and front wall 22 of box 18. Stabilizer bars 38 are lockably slidably mounted in mounting brackets 40. Brackets 40 are adjustably mounted onto the ends of cross-bar member 30 so that by loosening the associated bolt 40a holding the base flange 40b of bracket 40 onto the end of cross-bar member 30, the angle α formed between a bar 38 and floor 18a as seen in FIG. 3 may be adjusted. Stabilizer bars 38 may be slidably journalled through corresponding bores in mounting brackets 40 so that they may be extended or retracted along their length between cross-bar member 30 and front wall 22. Bars 38 are releasably locked by the tightening of bolts 42, mounted on brackets 40, down onto stabilizer bars 38. Thus stabilizer bars 38 may be slidably adjusted so as to engage stabilizer feet 38a mounted on the distal ends of stabilizer bars 38 firmly against front wall 22 and may be inclined so as to brace feet 38a into the intersection between wall 22 and bed or floor 18a. Stabilizer bars 38 thereby provide support and resistance in direction B to the rolling impact in direction C of a wheel 28 being lodged snugly between clamp members 26.

The vertical spacing between cross-bar members 12 and 30 is such that wheel 28 may be inserted in direction C sufficiently so that the forward end of tire 28a passing between clamp members 26 rolls past a pair of vertically elongate opposed facing apertures or slots 26a, and similarly so that the tire rim 28b also is translated past slots 26a. This enables a locking bar 44 to be passed behind the forward ends of the tire and rim and through both slots 26a and through the annular spoke area 28c of wheel 28 aligned between slots 26a. With locking bar 44 so positioned through spoke area 28c and behind the forward end of rim 28b, and journalled through slots 26a, a rigid U-shaped hasp 46 may be placed over members 26 and lockably mated with locking bar 44. Locking bar 44 and hasp 46 may be a conventional bike lock such as sold under the trademark Kryptonite. In order to assist the insertion of tire 28 in direction C between clamp members 26, the opening into each bike wheel clamp 24 may be convergent by the use of inclined faces 26b on clamp members 26.

Thus, each wheel clamp assembly 24 includes a pair of vertically aligned opposed facing clamping members 26 forming a funnel or wedge-shaped entryway to guide a wheel 28 into the clamp. The open channel or slots 26a running up the middle of each clamp member 26 allow the locking bar 44 of a U-shaped bicycle lock 48 to be releasably mounted onto the wheel clamp assembly locking the tire 28 between the opposed pair of clamp members.

The lower ends of the vertical clamp members 26 are stabilized by the lower horizontal cross-bar 30. The lower ends of the vertical clamp members 26 are mounted to the lower horizontal cross-bar 30 so as to allow the bottom of the clamp opening to be adjusted for the width of the tire just as the top of the clamp opening may be adjusted for the width of the tire also. The telescoping stabilizer bars 38, although illustrated as extending horizontally from cross-bar 30 to front face 22 may also extend at an angle relative to bed 18a for example downwardly into the lower forward corner or seam between bed 18a and front wall 22, so long as rotation of clamping members 26 out of their vertical plane is resisted both during insertion of wheel 28 in direction C snugly between clamping members 26 and when wheel 28 is removed in the opposite direction from between the clamping members.

As seen FIGS. 5 and 6, a third bike wheel clamp assembly 24' may be mounted onto cross-bar members 12 and 30 by means of a mounting adapter 50, so as to occupy the medial position between bike wheel clamp assembly 24 on rack 10. Upper channel 52 hooks underneath cross-bar member 12 and lower channel 54 hooks over cross-bar member 30 by means of adjusting the telescopic fit between lower post 56 and upper tube 58, for example by loosening bolt 60, removing pin 62, placing the channels in engagement with their corresponding cross members, and then re-tightening bolt 60. Channel 52 is cantilevered from the top of tube 58 adjacent upper arm 64 which extends oppositely from channel 52 so as to support bike wheel clamp assembly 24'. Similarly, lower channel 54 is cantilevered from the lower end of post 56 adjacent lower arm 66 which extends oppositely so as to support the lower end of bike wheel clamp assembly 24'. Horizontal slide bars 68 and 70 are mounted, respectively, at the ends of arms 64 and 66 opposite to channels 52 and 54. Clamp members 26' are mounted in opposed facing relation in the manner of bike wheel clamp assembly 24 on slide bars 68 and 70 by means of collars 72 and 74 respectively, the collars being releasably lockable in lateral position along the slide bars by means of loosening and tightening of bolts 76 threadably mounted through the collars. Thus the width of the gap between clamp members 26' may be adjusted in direction A" to snugly accommodate therebetween a wheel 28.

Figure 7:
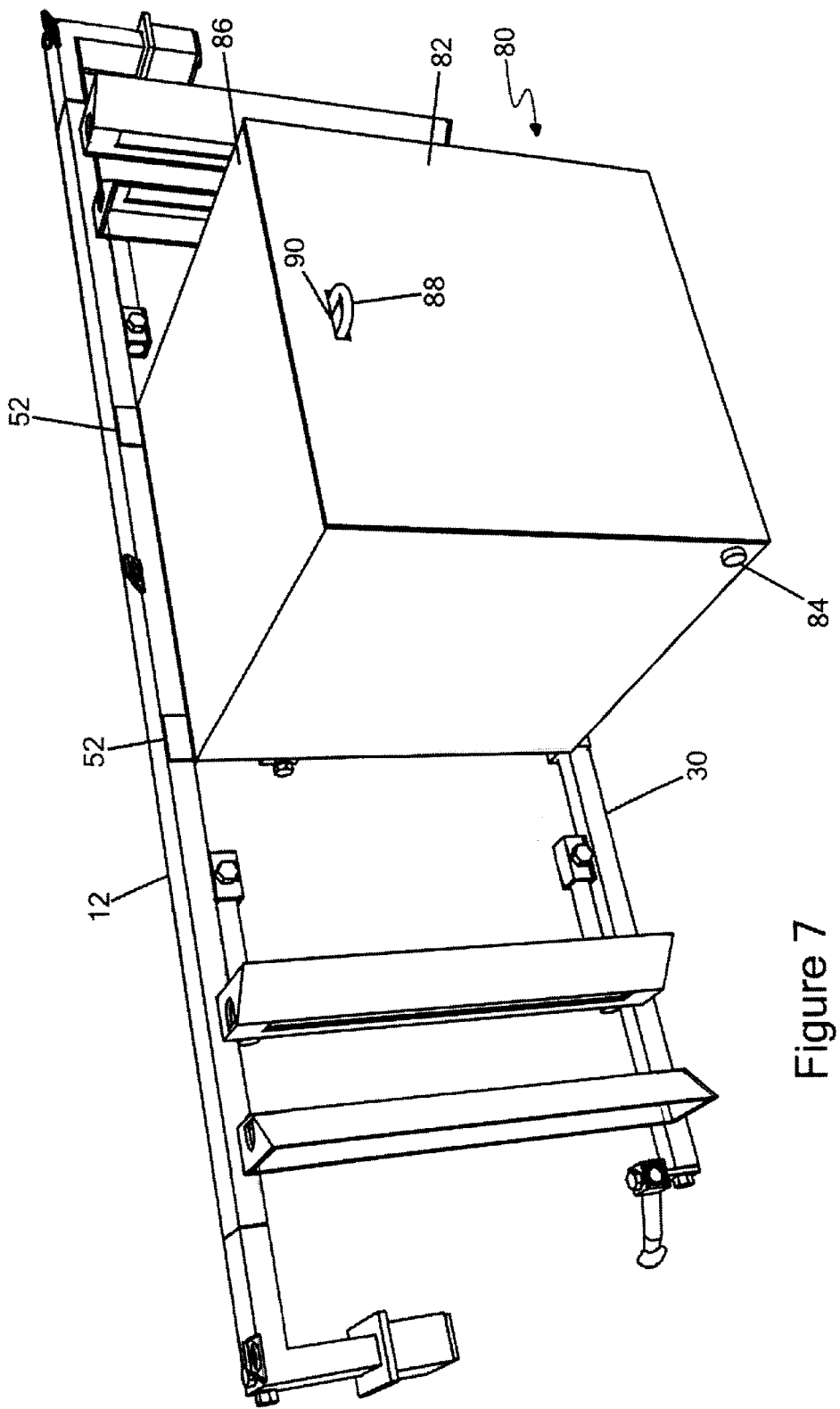
FIG. 7 is, in perspective view, a further alternative embodiment of the rack according to the present invention incorporating a utility box mounted between the bike wheel clamp assembly, the utility box in its closed position.
Figure 9:
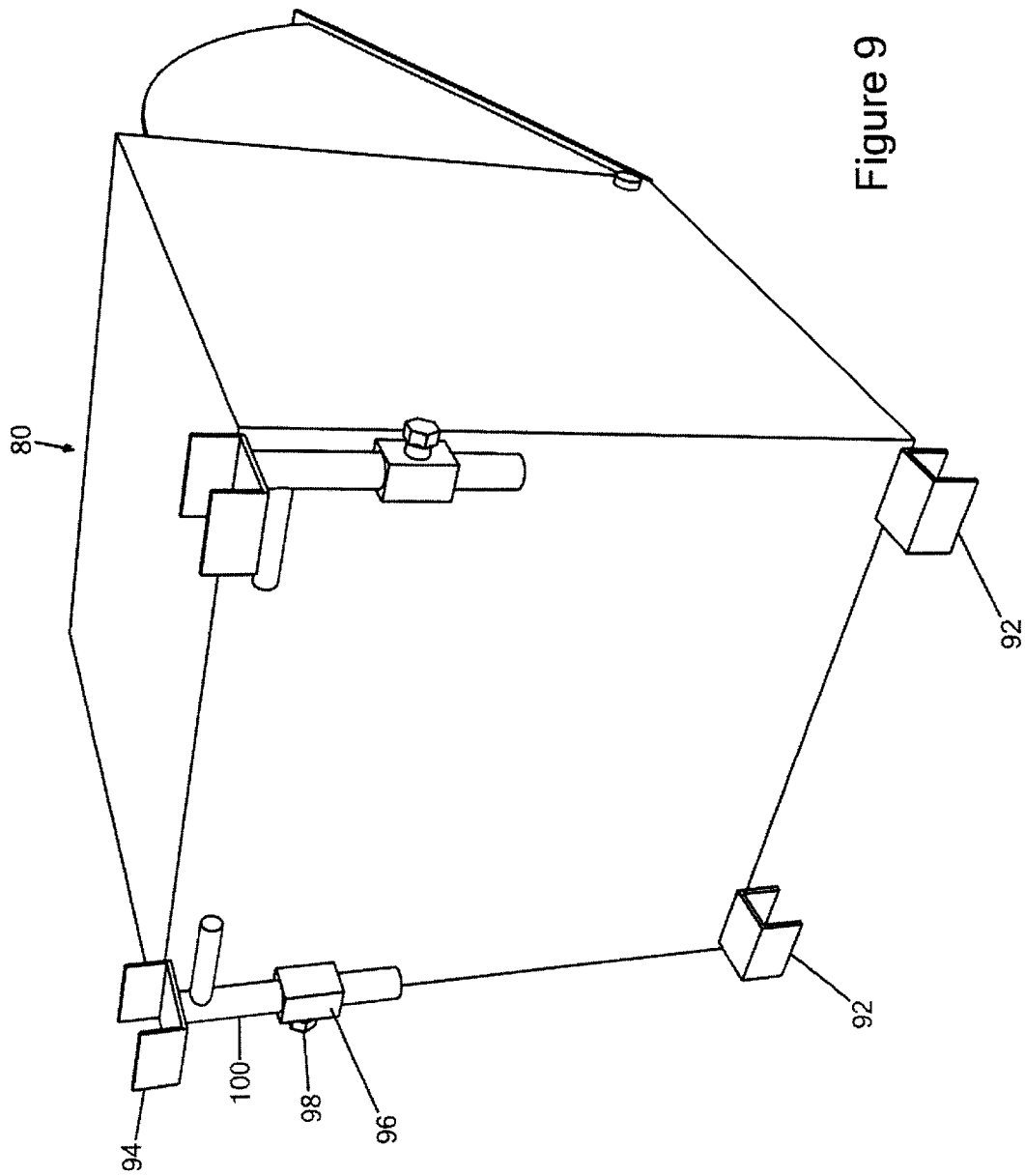
FIG. 9 is, in rear perspective view, the utility box of FIG. 8.

Alternatively, as seen in FIGS. 7–9, a utility box 80 may be mounted between cross-bar members 1 and 30 so that, instead of a third bike wheel clamp assembly being mounted to the rack, a utility box 80 may be mounted in the center position for carrying the user's accessories such as helmets, boots etc. In the illustrated embodiment, which is not intended to be limiting, the box may be effectively a cube, for example being twenty inches high, twenty inches deep, and twenty-two inches wide, and having a pivotally mounted compartment 82 pivoting about rotatable joints 84 at the opening to an otherwise closed generally cubic housing 86. A U-shaped lock bar 88 may be rigidly mounted so as to protrude outwardly through the opening of housing 86. U-shaped bar 88 cooperates with an aperture 90 in the front face of compartment 82 so that, with the compartment rotated so as to close the opening to the housing, bar 88 protrudes through aperture 90 as seen in FIG. 7 so that, by use of a padlock (not shown) or the like, utility box 80 may be locked shut. Box 80 is mounted to the cross-bar members by lower channel members 92 engaging lower cross-bar member 30, and upper channel members 94, being slidably adjusted in collars 96 mounted to box 80, engaging upper cross-bar member 12, bolts 98 releasably locking shafts 100, on which members 94 are rigidly mounted, in collars 96.

It is applicants' intention that, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A rack for mounting to a vehicle comprising:
   a) horizontal upper and lower cross members,
   b) a pair of downwardly disposed mounting posts mounted on opposite ends of said upper cross member,
   c) at least one wheel clamp assembly mounted, at an upper end thereof, to said upper cross member and mounted at a lower end thereof to said lower cross member, wherein each wheel clamp assembly of said plurality of wheel clamp assembly includes first and second opposed facing parallel vertical clamp members defining a wheel receiving space therebetween sized for snug mating on either side of a wheel disposed between said clamp members and said cross members, and wherein said clamp members each have laterally aligned apertures therethrough sized and positioned to accommodate a lock bar of a lock journalled therethrough so that the lock bar may be inserted through the spokes of the wheel and so that a U-shaped hasp of the lock may be positioned over upper ends of said clamp members into locking engagement with the lock bar journalled through said apertures whereby the wheel is releasably locked between said clamp members.

2. The rack of claim 1 further comprising at least one stabilizer bar mounted to said lower cross member so as to extend forwardly and rigidly for bracing of said lower cross member against the vehicle when said rack is mounted thereon.

3. The rack of claim 1 wherein said mounting posts are telescopically mounted to said ends of said upper cross member for lateral telescopic adjustment of a lateral spacing between said mounting posts.

4. The rack of claim 1 wherein said apertures are elongate, vertical slots in said clamp members.

5. The rack of claim 4 wherein said clamp members have opposite forward and rear faces, and wherein said rear faces are mounted to said cross members and said forward faces are canted into said wheel receiving space so as to define a convergent entryway into said wheel receiving space for assisting entry of the wheel between said clamp members.

6. The rack of claim 5 wherein said clamp members have bearing faces between corresponding said forward and rear faces, said bearing faces extending in parallel spaced apart array on opposite sides of said wheel receiving space.

7. The rack of claim 6 wherein said slots are formed in said bearing faces and extend vertically, substantially the length of said bearing faces.

8. The rack of claim 1 wherein said at least one wheel clamp assemblies includes a pair of said wheel clamp assemblies mounted to said cross members at opposite ends of said cross members so as to leave a utility spacing therebetween along said cross members.

9. The rack of claim 8 further comprising a modularly mountable third wheel clamp assembly releasably mountable to said cross members in said utility spacing.

10. The rack of claim 8 further comprising a modularly mountable utility container releasably mountable to said cross members in said utility spacing.

11. The rack of claim 2 wherein said mounting posts are telescopically mounted to said ends of said upper cross member for lateral telescopic adjustment of a lateral spacing between said mounting posts.

12. The rack of claim 11 wherein said apertures are elongate vertical slots in said clamp members.

13. The rack of claim 12 wherein said clamp members have opposite forward and rear faces, and wherein said rear faces are mounted to said cross members and said forward faces are canted into said wheel receiving space so as to define a convergent entryway into said wheel receiving space for assisting entry of the wheel between said clamp members.

14. The rack of claim 13 wherein said clamp members have bearing faces between corresponding said forward and rear faces, said bearing faces extending in parallel spaced apart array on opposite sides of said wheel receiving space.

15. The rack of claim 14 wherein said slots are formed in said bearing faces and extend vertically, substantially the length of said bearing faces.

16. The rack of claim 15 wherein said at least one wheel clamp assemblies includes a pair of said wheel clamp assemblies mounted to said cross members at opposite ends of said cross members so as to leave a utility spacing therebetween along said cross members.

17. The rack of claim 16 further comprising a modularly mountable third wheel clamp assembly releasably mountable to said cross members in said utility spacing.

18. The rack of claim 17 further comprising a modularly mountable utility container releasably mountable to said cross members in said utility spacing.

\* \* \* \* \*